(12) United States Patent
Huang et al.

(10) Patent No.: US 7,116,370 B1
(45) Date of Patent: Oct. 3, 2006

(54) IMAGE PROCESSING SYSTEM OPTICAL SHIFTING MECHANISM

(75) Inventors: Austin L. Huang, Vancouver, WA (US); Scott Daly, Kalama, WA (US); Dean Messing, Camas, WA (US); Jeffrey B. Sampsell, Vancouver, WA (US)

(73) Assignee: Sharp Laboratories of Ameria, Inc., Camas, WA (US)

( * ) Notice: Subject to any disclaimer, the term of this patent is extended or adjusted under 35 U.S.C. 154(b) by 0 days.

(21) Appl. No.: 09/540,281

(22) Filed: Mar. 31, 2000

(51) Int. Cl.
*H04N 5/225* (2006.01)

(52) U.S. Cl. .................... 348/335; 348/207.99

(58) Field of Classification Search ............ 349/33, 349/41; 359/493; 348/218.1, 219.1
See application file for complete search history.

(56) References Cited

U.S. PATENT DOCUMENTS

| | | | |
|---|---|---|---|
| 4,575,193 A | 3/1986 | Greivenkamp, Jr. | |
| 4,605,956 A | 8/1986 | Cok | |
| 4,626,897 A | 12/1986 | Sato et al. | |
| 4,626,919 A | 12/1986 | Marom | |
| 4,663,661 A | 5/1987 | Weldy et al. | |
| 4,743,100 A | 5/1988 | Nakada et al. | |
| 4,760,834 A | 8/1988 | Chevalier | |
| 4,761,682 A | 8/1988 | Asaida | |
| 4,786,964 A | 11/1988 | Plummer et al. | |
| 4,882,619 A | 11/1989 | Hasegawa et al. | |
| 4,969,717 A | 11/1990 | Mallinson | |
| 4,977,450 A | 12/1990 | Yokota | |
| 4,988,171 A | 1/1991 | Yokota | |
| 5,013,140 A | 5/1991 | Healey et al. | |
| 5,014,121 A | 5/1991 | Hasegawa et al. | |
| 5,091,795 A * | 2/1992 | Nishioka et al. .......... | 349/1 |
| 5,134,516 A | 7/1992 | Lehureau et al. | |
| 5,237,446 A | 8/1993 | Takahashi | |
| 5,270,825 A | 12/1993 | Takasugi et al. | |
| 5,309,239 A | 5/1994 | Bouwhuis | |
| 5,369,266 A | 11/1994 | Nohda et al. | |
| 5,452,129 A | 9/1995 | Shiraishi | |
| 5,471,343 A | 11/1995 | Takasugi | |
| 5,477,381 A | 12/1995 | Sasaki et al. | |
| 5,570,178 A | 10/1996 | Malinowski et al. | |
| 5,594,420 A | 1/1997 | Copeland et al. | |
| 5,682,266 A | 10/1997 | Meyers | |

(Continued)

FOREIGN PATENT DOCUMENTS

EP          0 254 497 A2 *   1/1988

(Continued)

*Primary Examiner*—Thai Tran
*Assistant Examiner*—Heather R. Jones
(74) *Attorney, Agent, or Firm*—Chernoff, Vilhauer, McClung & Stenzel (57) ABSTRACT

An image processing system processes light conveying visual pattern information represented by individual light rays. The system includes an optical assembly having an input surface and an output surface. The input and output surfaces define a plurality of input and output positions, respectively, for the light rays to enter and exit, respectively, the assembly. The assembly includes a light-shifting apparatus operable so that a respective one of the light rays entering a respective one of the input positions is selectively shiftable by the apparatus in a first direction and, subsequently, in a second direction angled with respect to the first direction from a preceding one to another of the output positions. The assembly is further operable so that following each shifting operation, a respective one of the light rays transmitted by the assembly from an arbitrarily selected one of the output positions is solely derived from the light received from a single one of the input positions.

72 Claims, 7 Drawing Sheets

U.S. PATENT DOCUMENTS

| | | |
|---|---|---|
| 5,684,293 A | 11/1997 | Kessler |
| 5,715,085 A | 2/1998 | Takatori et al. |
| 5,764,287 A | 6/1998 | Tatsumi |
| 5,806,759 A | 9/1998 | Axisa |
| 5,834,761 A * | 11/1998 | Okada et al. ............ 250/208.1 |
| 5,850,377 A | 12/1998 | Taguchi et al. |
| 5,875,034 A * | 2/1999 | Shintani et al. ............ 358/296 |
| 6,025,875 A * | 2/2000 | Vu et al. .................... 348/241 |
| 6,121,087 A * | 9/2000 | Mann et al. ................ 438/258 |
| 6,184,516 B1 * | 2/2001 | Sawada et al. .......... 250/214.1 |
| 6,686,958 B1 * | 2/2004 | Watanabe et al. ........ 348/231.1 |
| 2002/0022325 A1 * | 2/2002 | Gardner et al. ............. 438/287 |

FOREIGN PATENT DOCUMENTS

| | | | |
|---|---|---|---|
| EP | 01 751 683 A | | 1/1997 |
| JP | 04063074 | * | 2/1992 |
| JP | 04063074 A | * | 2/1992 |
| JP | 9-152572 | | 7/1995 |
| JP | 08-107517 | * | 4/1996 |

* cited by examiner

IMAGE PROCESSING SYSTEM OPTICAL SHIFTING MECHANISM

BACKGROUND OF THE INVENTION

The present invention relates to an image processing system that may be employed in association with an optical detection and acquisition system, such as a camera, in order to improve the quality of images acquired by the detection and acquisition system.

In the design of optical detection and acquisition systems, a significant problem has been the susceptibility of such systems to aliasing distortions or undersampling artifacts. This effect occurs when a detection system acquires an image having a visual pattern containing high spatial frequency components as, compared to the spatial sampling density of the photoreceptor array employed in the detection system. Thus, if a camera having a solid state array of photosensors is directed at a pattern of alternating dark and light fine stripes, a familiar moire pattern having wavy or flickering lines can distort the resolved image.

It is well known that aliasing distortion can be eliminated by removing spatial frequency components in the image spectrum that exceed half of the spatial sampling rate. For this purpose, low pass "blur" filters based on birefringent materials have been developed that split the light being received at any one input so that the light received by any one photoreceptor represents an average of the light received at two or more adjacent inputs. Typical constructions of passive filters of this type are shown in Greivenkamp, Jr., U.S. Pat. No. 4,575,193, Sato et al., U.S. Pat. No. 4,626,897, and Weldy et. al., U.S. Pat. No. 4,663,661. In Asaida, U.S. Pat. No. 4,761,682, a cascaded design is shown wherein three serially arranged crystal plates (birefringent crystals) are used to project a pattern on the photosensor of eight separate rays for each single input ray. A substantial difficulty with such designs, however, is that the blur filter significantly limits the capacity of the detection system to produce sharp images, i.e., anti-aliasing and retaining sharpness are competing goals.

Figure 1:
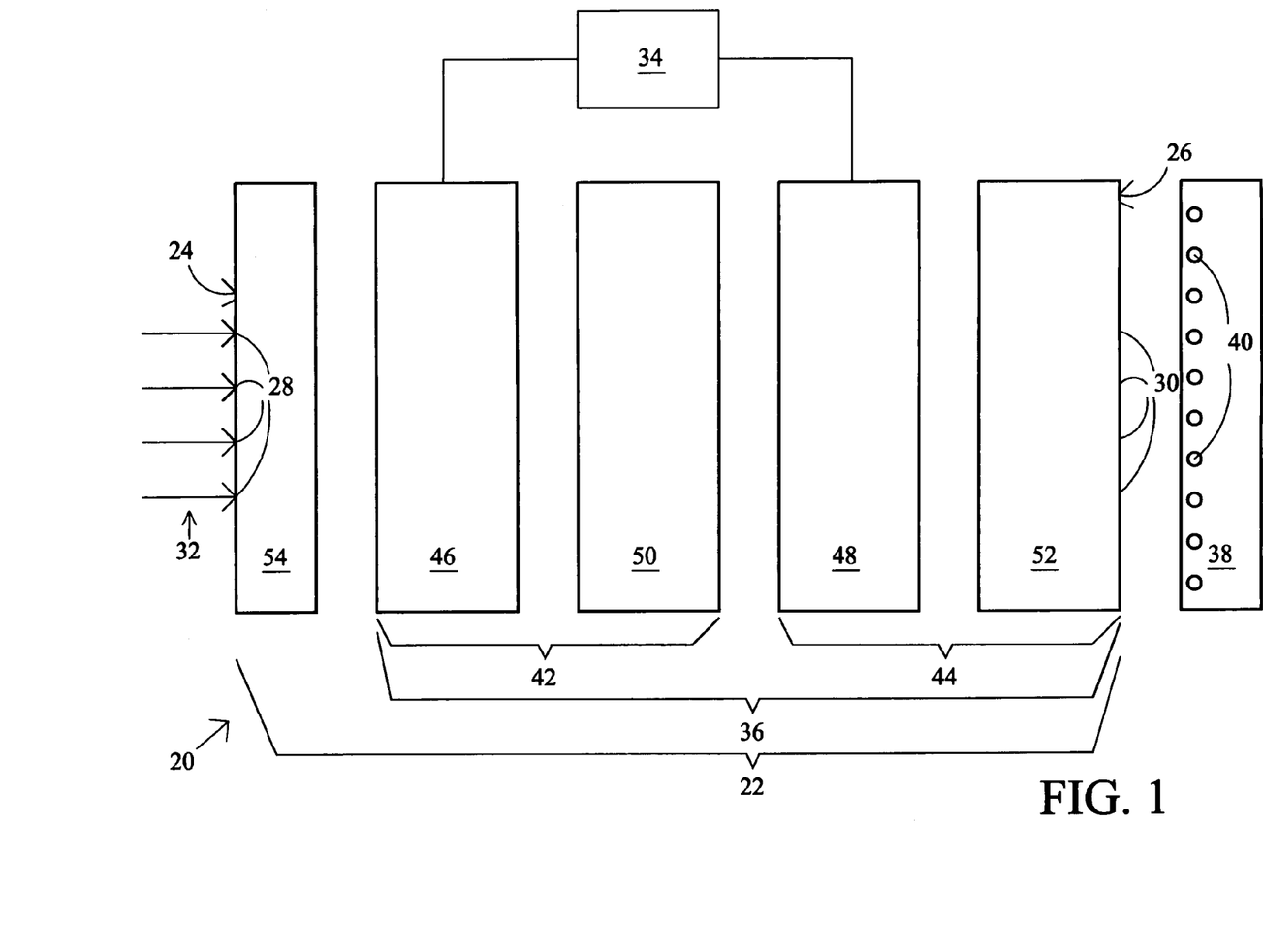
FIG. 1 depicts an exemplary embodiment of an image processing system of the present invention.

In order to achieve one or both goals of preventing aliasing distortion and enhancing sharpness, dynamically controllable image processors have been developed. Nohda et al., U.S. Pat. No. 5,369,266, disclose solid-state image pickup devices for imaging an object using a CCD image sensor. The device, as shown in FIG. 1, includes a birefringent plate that splits the incident beam into two plane polarized rays of mutually perpendicular polarizations that are spatially displaced from each other. The rays are then incident on an electronically controllable liquid crystal plate that selectively rotates the state of the incident ray or passes the state of the incident ray unchanged. A polarizer then blocks one or the other of the rays dependant on its state so that the output beam alternates between a first and a second linearly displaced position. Thus, the input images can be shifted back and forth between the photoreceptors to allow interpixel sampling of the input image for enhanced sharpness. However, the embodiment shown in FIG. 1, is a single stage device only functional for enhancing the sharpness of an image in a single linear direction.

Nohda et al. disclose in FIG. 2 a further embodiment of a device that includes a dual pair of electronically controllable birefringent crystals is used having their respective optic axes arranged so that the light recombines in the device after splitting, while still providing an output beam shiftable between two linearly displaced positions. Unfortunately, the crystals need to have perfectly matched characteristics and the dual electronic controls need control signals that exactly correspond electrically for the device to operate properly.

Other references that disclose image processors for shifting an input beam between a pair of linearly spaced output positions are disclosed by Hasegawa et al., U.S. Pat. No. 4,882,619; Nishioka et al., U.S. Pat. No. 5,091,795; and Tatsumi, U.S. Pat. No. 5,764,287. In particular, Hawegawa et al. show an electronically switchable liquid crystal and prism assembly for shifting the input beam for interpixel resolution enhancement.

Niskioka et al., in particular, disclose in FIGS. 12A and 12B an image processor for linearly shifting a beam between two output positions wherein the beam is first divided by a controllable birefringent plate and then recombined by a second controllable birefringent plate to divert the beam to one of the output positions. In this respect, Niskioka et al. structure is like that shown in Nohda et al., however, in the Niskioka et al. device the driving voltage is changed at a speed twice the readout period of the CCD sensor. The effect is to cause low pass filtering for reducing aliasing rather than to enhance sharpness. In any event, in this respect it shares Nohda et al.'s disadvantage of requiring matched electronically controlled devices.

Tatsumi in particular discloses in a first embodiment yet another image processor for shifting one input beam between a pair of output positions in order to achieve interpixel sampling for enhanced sharpness. The incident light beam is passed through a polarizer and then through an electronically controllable liquid crystal element that transmits a plane polarized beam having one or another rotation state. The light then proceeds to a birefringent crystal where the light beam is directed to one or another of the output positions depending on its state. In a second embodiment, Tatsumi discloses a phase plate and second birefringent crystal that are added to the assembly of the first embodiment to obtain a pair of simultaneous output beams thereby providing the blurring effect. Each output beam is linearly shiftable, in a single direction as before, using the electronically controllable liquid crystal element so as to provide interpixel sampling thereby achieving enhanced sharpness compatibly with the blurring anti-aliasing effect of the simultaneous beams. Unfortunately, this dual birefringent crystal device only enhances sharpness along a single dimension. Moreover, the simultaneous beams limit the capacity of the device for sharply resolving finely detailed images.

Another patent that is directed toward compatibly achieving simultaneous sharpness enhancement and aliasing reduction is Okada et al., U.S. Pat. No. 5,834,761. Okada et al. accomplish sharpness enhancement by mechanically tilting a double refraction plate to produce a shifting beam. At the same time a pair of double refracting cells following the refraction plate are mechanically rotatable relative to each other to split the shifted beam into simultaneous output beams to accomplish the blurring effect for aliasing reduction. The moving parts decrease reliability, require excessive space to operate, are cumbersome, are bulky, tend to get out of alignment, and are not reliable. Moreover, the simultaneous beams limit the capacity of the device for sharply resolving finely detailed images.

Referring again to Niskioka et al., a two stage image processor is described, (see generally FIGS. 6–8), wherein each stage includes a birefringent crystal followed by an electronically controllable liquid crystal element, succeeded by another birefringent crystal. A quarter wave plate is interposed between the two stages. Each light ray incident on the assembly is split into four simultaneous output beams for blurring, where the output beams are each shiftable in a two-dimensional pattern in reverse directions from the other. Unfortunately, each output beam is derived from light entering multiple input locations. This results in a loss of information and a resulting reduction in sharpness enhancement capacity.

What is desired, therefore, is an image processing system that is suitable to remove undesirable alias distortion and/or perform resolution enhancement.

BRIEF SUMMARY OF THE INVENTION

In accordance with the present invention, in a first aspect, an image processing system processes light conveying visual pattern information and represented by a continuum of individual light rays. The system includes an optical assembly having an input surface and an output surface. The input and output surfaces define a plurality of input and output positions, respectively, for the light rays to enter and exit, respectively, the assembly. The assembly includes a light-shifting apparatus operable so that a respective one of the light rays entering a respective one of said input positions is selectively shiftable by the apparatus in a first direction and, subsequently, in a second direction angled with respect to said first direction from a preceding one to another of the output positions. The assembly is further operable so that following each shifting operation, a respective one of the light rays transmitted by the assembly from an arbitrarily selected one of the output positions is solely derived from the light received from a single one of the input positions.

In a second aspect, the image processing system includes opposing first and second light-shifting devices, each device being operable so that a respective one of the light rays incident thereon is reversibly shiftable by the device in a corresponding direction. The devices are independently controllable and relatively configured so that the directions are out of alignment with each other so as to enable a respective one of the input rays entering a respective one of the input positions to be shifted consecutively to a first one, second one, third one, and fourth one of the output positions in a manner defining a two-dimensional pattern. Each device is configured so that if a respective one of the rays is shifted by the device, then each one of the light rays transmitted by the device is correspondingly shifted together with the respective one of the rays in the same direction by the same amount.

In a third aspect, the assembly includes a first and second light-shifting device having a first and second light-rotating unit (such as polarization), respectively, each unit being operable so that a respective one of the light rays transmitted thereby is selectively rotatable between a pair of plane polarized states. The devices are serially configured so as to enable a respective one of the light rays entering a respective one of the input positions to be consecutively shifted between a first one, second one, third one, and fourth one of the output positions in correspondence with the four discrete combinations of the states selectable via the light-rotating units. The assembly further is operable so that following each shifting operation, each one of the light rays transmitted by the assembly is restricted in travel within the assembly to a corresponding one of a series of internal paths extending in substantially parallel relationship to each other.

In a fourth aspect, the assembly includes an optical assembly having an input surface and an output surface where the input and output surfaces define a plurality of input and output positions, respectively, for the light rays to enter and exit, respectively, the assembly. The assembly includes a light-shifting apparatus operable so that a respective one of the light rays entering a respective one of the input positions is selectively shiftable by the apparatus in a first direction from one to another of the output positions and, subsequently, in a second direction nonaligned with the first direction from a preceding one to another of the output positions. The assembly further is operable so that the portion of the pattern information conveyed in each one of the light rays transmitted by the assembly is, following each shifting operation, preserved free of combination with the portion of the pattern information conveyed by any other ones of the light rays.

In a fifth aspect, the image sensor includes an array of photoreceptors spaced apart from each other at lower spatial density than the visual pattern information such that the pattern information, in the absence of processing by the system, includes aliasing components. The optical assembly has an input surface and an output surface where the input and output surfaces define a plurality of input and output positions, respectively, for the light rays to enter and exit, respectively, the assembly. The assembly includes a light-shifting apparatus operable so that a respective one of the light rays entering a respective one of the input positions is selectively shiftable by the apparatus between a pair of the output positions. The assembly is arranged so that the light transmitted from the output positions is projected onto the sensor. A mode-controlling device alternately operates the optical assembly in a first and second mode such that the aliasing components are alternately removed and retained by the assembly in the first and second mode, respectively.

In a sixth aspect, the optical assembly has an input surface and an output surface where the input and output surfaces defining a plurality of input and output positions, respectively, for the light rays to enter and exit, respectively, the assembly. The assembly includes a light-shifting apparatus operable so that a respective one of the light rays entering a respective one of the input positions is selectively shiftable by the apparatus between a pair of the output positions. A mode-controlling device alternately operates the optical assembly in a first and second mode such that the rate at which the apparatus shifts a respective one of the light rays between respective ones of the output positions is increased and decreased for operation in the first mode and second mode, respectively.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIGS. 2A–5A show how a series of incident light rays are processed by the system of FIG. 1 for different control state combinations.

FIGS. 2B–5B show a magnified cutaway plane view of a two dimensional array of photoreceptors of the sensor of FIG. 1 at the respective different control state combinations of FIGS. 2A–5A.

DETAILED DESCRIPTION OF THE PREFERRED EMBODIMENT

FIG. 1 depicts an image processing system 20 that includes an optical assembly 22 having an input surface 24 and an output surface 26. The input and output surfaces 24, 26 define a plurality of continuous input and output positions 28 and 30, respectively, for individual light rays 32 of an image to enter (light rays 32) and exit (light rays 33, see FIGS. 2A–5A), respectively, the optical assembly 22. In general, the light rays 32 are preferably randomly polarized light. However, any type of polarized light may be used, if desired. The image processing system 20 includes a mode-controlling device 34 that operates a light shifting apparatus 36 so that a respective one of the light rays 32 incident on a corresponding one of the input positions 28 is selectively shiftable consecutively between different ones of the output positions 30 for projection onto an image sensor 38. The mode-controlling device 34 permits dynamic control of the image processing system 20. The sensor 38 preferably includes a two-dimensional array of photo-receptors 40. The optical assembly, though shown in exploded view, is preferably a compact unitary laminated structure that can operate in the environment of a digital imaging device, such as a still or video camera. Normally the image sensor may constitute a charge-coupled-display (CCD) device. As explained further below, the capability of selectively shifting the image in response to the mode-controlling device 34 allows removal of undesirable aliasing distortion compatibly with resolution enhancement.

The light shifting apparatus 36, in the preferred embodiment, includes a first and second light shifting device 42, 44 in a cascaded arrangement. The first and second light shifting device 42, 44 include a first and second light rotating unit 46, 48, respectively, and a first and second light-shifting unit 50, 52, respectively. A linear polarizing device 54 preferably precedes the light shifting apparatus 36 to provide polarized light thereto. The linear polarizing device 54 may be any type of polarizing device, such as for example, an absorptive type (e.g. iodine or dye type) or reflective type (e.g. Dual Brightness Enhancement Film available from 3M) to provide linear polarization and substantially lossless optical transmission.

The light-rotating units 46, 48 are preferably independently controllable by the mode-controlling device 34. The light rotating units operate so that a plane polarized light ray incident thereon is selectably rotatable between a pair of plane polarized states. In the preferred embodiment the first and second light rotating units 46, 48 are preferably fast switching (e.g. a switching rate on the order of 100 us or less) and are electronically controllable liquid crystal devices. Such devices may include, for example, twisted nematic, super twisted nematic, vertical alignment nematic, horizontal aligned nematic, electronically controlled birefringence, anti-ferro electric, PI-cell, and deformed helix ferroelectric. The light shifting units 50, 52 spatially shift the light based on the light's plane polarized state. In the preferred embodiment the light shifting units 50, 52 are birefringent crystals of doubly refracting material, such as sodium, calcium, salt, or more commonly available calcite. A typical image sensor 38 may have on the order of 350,000 photoreceptors or picture elements (pixels) 40 in a 3 by 4 aspect ratio.

Figure 3A:
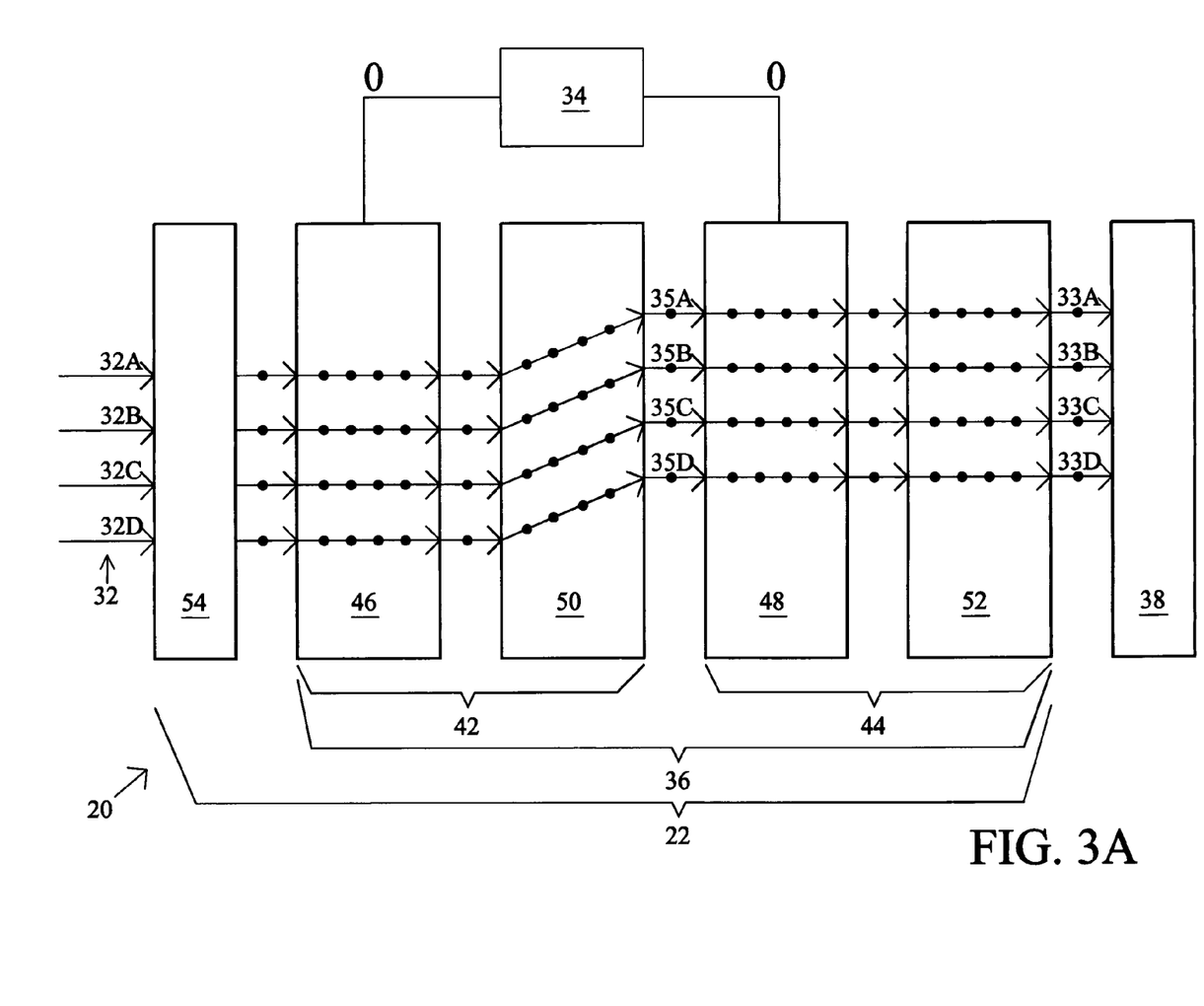
Figure 3B:
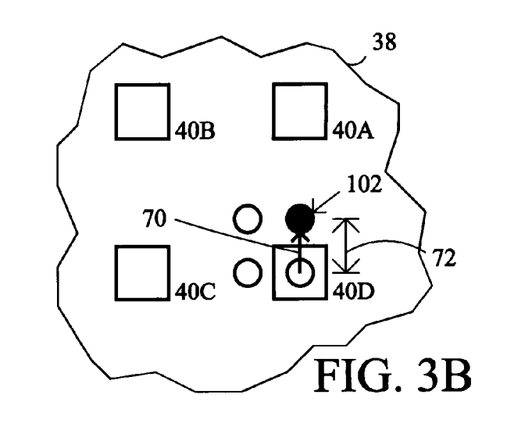
Figure 4A:
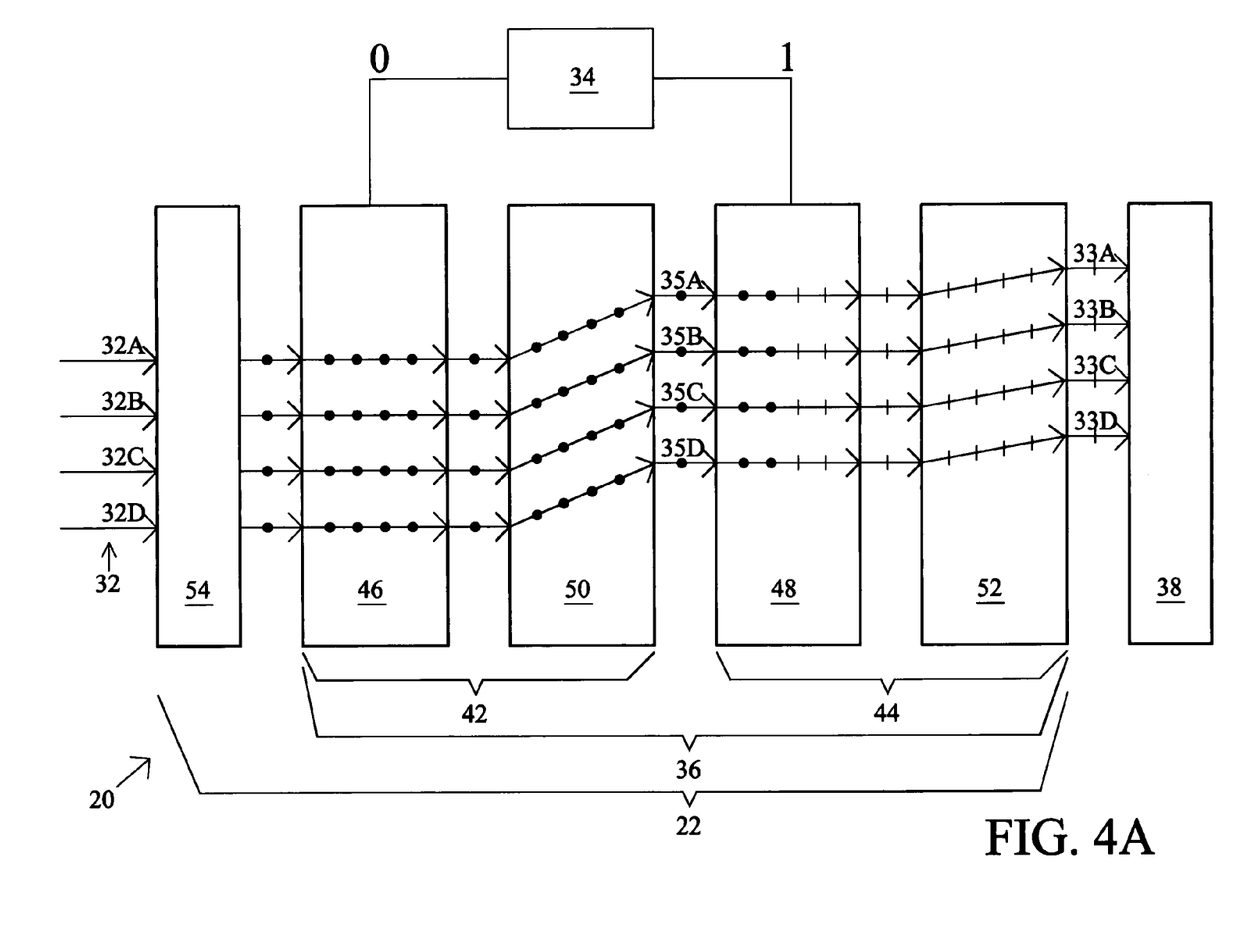
Figure 4B:
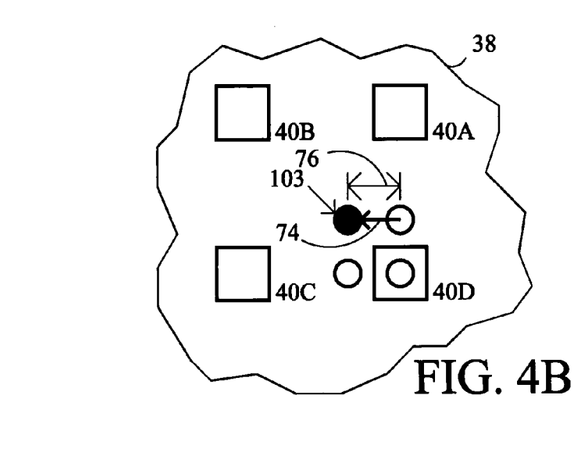
Figure 5A:
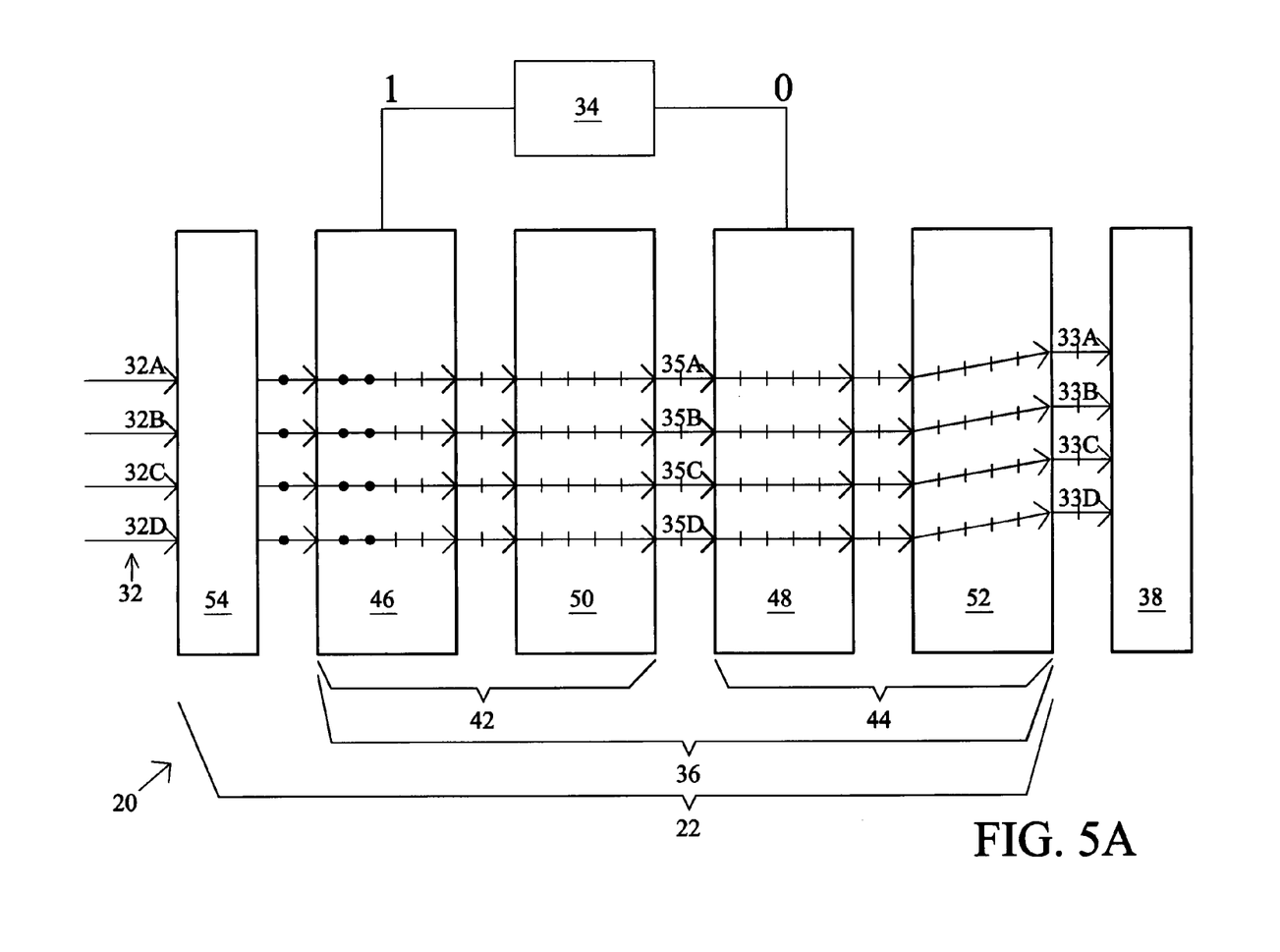
Figure 5B:
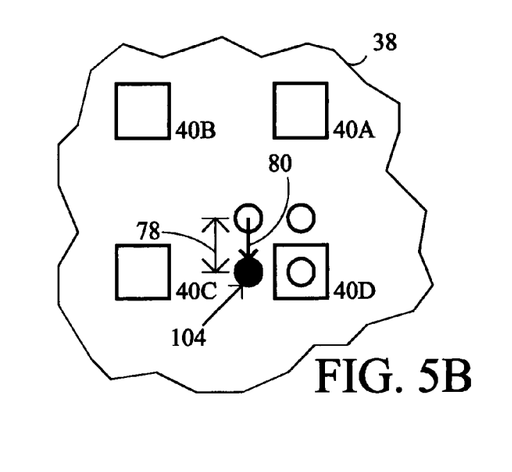

FIGS. 2–5 indicate how the image processing system 20 processes a series of closely adjacent input rays 32 as the mode-controller 34 cycles sequentially through four discrete control state combinations that are indicated in the drawings as "state 1,1 (FIG. 2), state 0,0 (FIG. 3), state 0,1 (FIG. 4), and state 1,0 (FIG. 5). The 0 refers to non-energization of each respective light rotating unit 46, 48 so that light incident thereon in a plane polarized state will pass through without rotation of the polarization plane. The 1 refers to energization of each respective light rotating unit 46, 48 so that light incident thereon in a plane polarized state will pass through with rotation of the polarization plane.

While the embodiments shown herein typically illustrate single or multiple light rays, it is to be understood that normally the incident light rays are actually a continuous image that is shifted relative to the sensor. Also, dots represent out of the plane polarization and line segments represent polarization parallel to the plane.

Figure 2A:
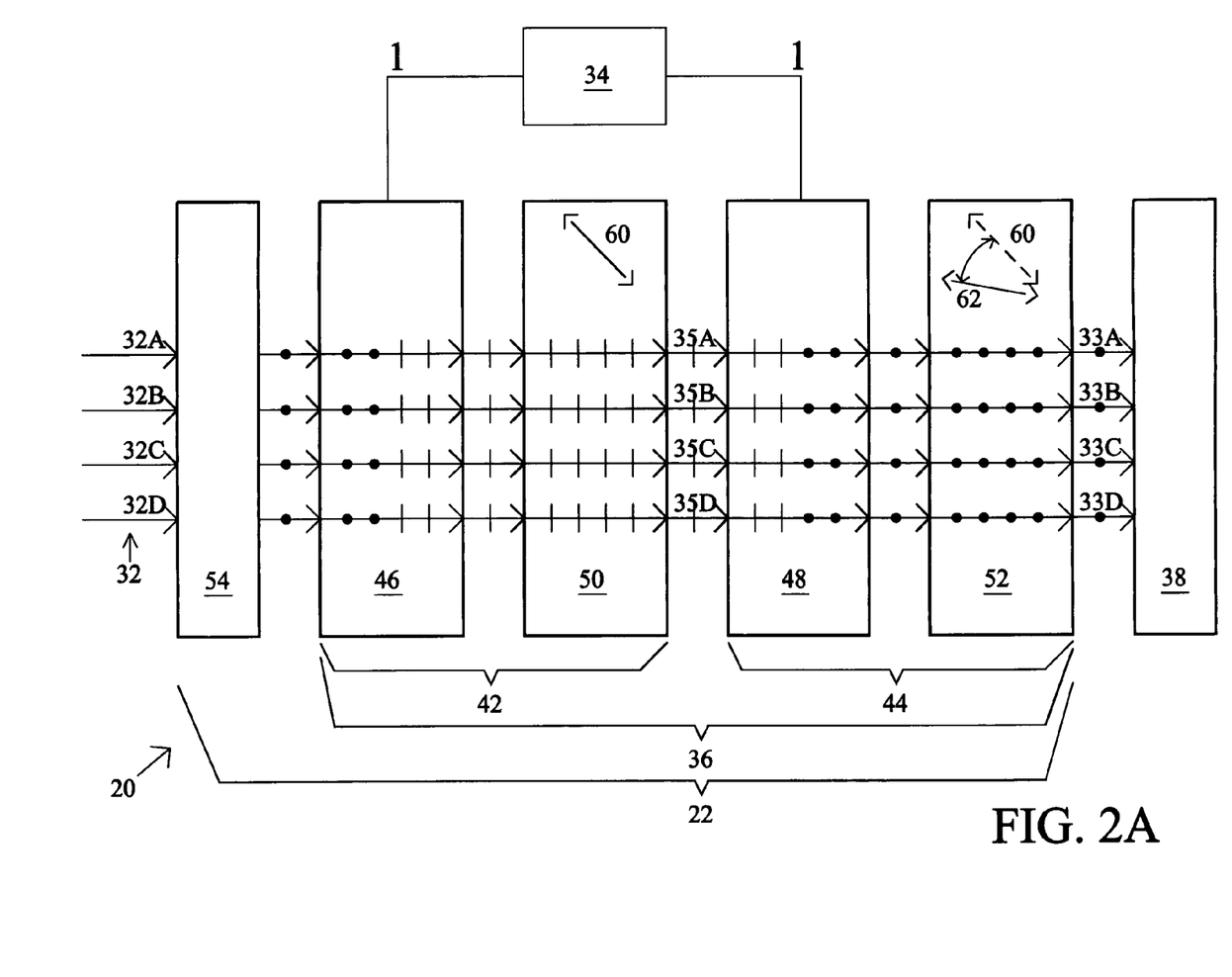

Referring to the preferred embodiment depicted in FIG. 2A with the mode-controller in state 1,1 a series of closely adjacent incident light rays 32 of randomly polarized light passes through the plan polarizer 54 so as to be transmitted as plane polarized (e.g., ordinary) light rays. The light rays then enter the energized (control state 1) first liquid crystal device 46 and pass through with a rotation of the polarization plane. (Preferably the transmission axes of the polarizer 54 is oriented with one of the director axes of the liquid crystal device 46.) The light rays then enter the first birefringent device 50 and are transmitted therefrom without spatial displacement (e.g. straight through) because the light rays in their ordinary rotation state are perpendicular to the optic axes 60 of the birefringent device 50. The light rays then enter the energized (control state 1) second liquid crystal second liquid crystal device 48 and pass through without a rotation of the polarization plane. The light rays then enter the second birefringent device 52 and are transmitted therefrom without spatial displacement (e.g. straight through) because the light rays in their ordinary rotation state are perpendicular to the optic axes 62 of the birefringent device 52. The optic axes 62 is directed out of the side of the page at a 90 degree rotation to optic axes 60 about the path of light transmission. The light rays then are incident on a sensor 38, as desired. It is to be understood that energized and non-energized merely refer to at least two different operational states of the device and doesn't necessarily relate to any particular electrical energy imposed thereon.

Figure 2B:
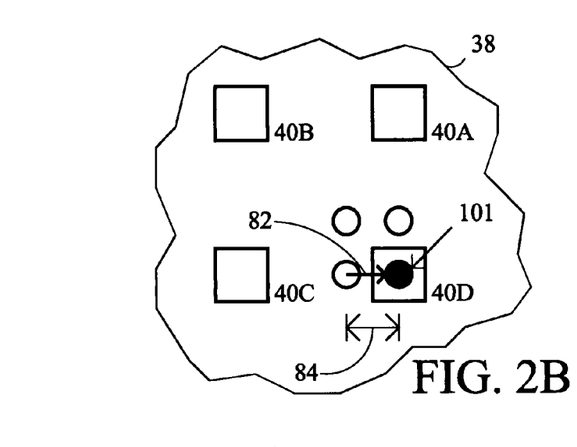

Referring to FIG. 2B, which shows a magnified cutaway plane view of a two dimensional array of photoreceptors 40a–40d on the sensor 38, one of the incident light rays on sensor 38 will be captured by a photoreceptor 40d. This orientation will be generally referred to as output position 101.

Referring to the preferred embodiment depicted in FIG. 3A with the mode-controller in state 0,0 a series of closely adjacent incident light rays 32 of randomly polarized light passes through the plane polarizer 54 so as to be transmitted as a plane polarized (e.g. ordinary) light rays. The light rays then enter the non-energized (control state 0) first liquid crystal device 46 and pass through without a rotation of the polarization plane (e.g. becoming extraordinary light rays). The light rays then enter the first birefringent device 50 and are transmitted therefrom with a vertical spatial displacement because the light rays in their extraordinary rotation state are parallel to the optic axes 60 of the birefringent device 50. In effect, the state of the light-rotating unit or liquid crystal device selectively controls the resulting shifting operation of the following birefringent device. The light rays then enter the non-energized (control state 0) second liquid crystal device 48 and pass through without a rotation of the polarization plane (e.g. becoming ordinary light rays again). The light rays then enter the second birefringent device 52 and are transmitted therefrom without spatial displacement (e.g. straight through) because the light rays in their ordinary rotation state are perpendicular to the optic axes 62 of the birefringent device 52. The light rays then are incident on a sensor 38, as desired.

Referring to FIG. 3B corresponding to FIG. 2B, the light ray that previously had an output position 101 centered on photoreceptor 40*d* is, following the shifting operation, shifted vertically in direction 70 by amount 72 so as to assume a new output position 102.

Referring to the preferred embodiment depicted in FIG. 4A with the mode-controller in state 0,1 a series of closely adjacent incident light rays 32 of randomly polarized light passes through the plane polarizer 54 so as to be transmitted as a plane polarized (e.g. ordinary) light rays. The light rays then enter the non-energized (control state 0) first liquid crystal device 46 and pass through without a rotation of the polarization plane (e.g. becoming extraordinary light rays). The light rays then enter the first birefringent device 50 and are transmitted therefrom with a vertical spatial displacement because the light rays in their extraordinary rotation state are parallel to the optic axes 60 of the birefringent device 50. The light rays then enter the energized (control state 1) second liquid crystal device 48 and pass through with a rotation of the polarization plane (e.g. remaining extraordinary light rays). The light rays then enter the second birefringent device 52 and are transmitted therefrom with horizontal spatial displacement because the light rays in their extraordinary rotation state are parallel to the optic axes 62 of the birefringent device 52. The light rays then are incident on a sensor 38, as desired.

Referring to FIG. 4B again corresponding to FIG. 3B, the light ray that in the last shifting operation had an output position 102 is shifted horizontally in direction 74 by amount 76 so as to assume a new output position 103.

Referring to the preferred embodiment depicted in FIG. 5A with the mode-controller in state 1,0 a series of closely adjacent incident light rays 32 of randomly polarized light passes through the plane polarizer 54 so as to be transmitted as a plane polarized (e.g. ordinary) light rays. The light rays then enter the energized (control state 1) first liquid crystal device 46 and pass through with rotation of the polarization plane (e.g. remaining ordinary light rays). The light rays then enter the first birefringent device 50 and are transmitted therefrom without a vertical spatial displacement. The light rays then enter the non-energized (control state 0) second liquid crystal device 48 and pass through without a rotation of the polarization plane (e.g. changing to extraordinary light rays). The light rays then enter the second birefringent device 52 and are transmitted therefrom with horizontal spatial displacement. The light rays then are incident on a sensor 38, as desired.

Referring to FIG. 5B again corresponding to FIG. 4B, the light ray that in the last shifting operation had an output position 103 is shifted vertically in direction 78 by amount 80 so as to assume a new output position 104.

It will be readily apparent that the transition from output position 104 to output position 101 in direction 82 by amount 84 in FIG. 2B will occur when the mode controller cycles again to state 0,0, as indicated in states 2A and 2B.

Preferably, the distances 72, 76, 78 and 84 over which each input ray shifts are less than the minimum distance between adjacent ones of the photoreceptors 40*a*–40*d* so as to enable the image processing system 20 to be used for interpixel sampling of the input image. In effect, the consecutive shifting operations permit the photoreceptors to capture successive snapshots of the input image to multiple fractionally displaced positions which is useful for enhanced resolution. In addition, the shifts may be done in a controlled and predetermined manner with the directions and distances of the shifts known.

Referring to FIGS. 1, 2A–5A, it may be observed in the preferred embodiment that each electronically controllable liquid crystal 46, 48 and corresponding birefringent crystal 50, 52 form light-shifting devices 42, 44 which are serially cascaded together. It will further be noted that each light shifting device is operable so that a respective one of the light rays 32 incident thereon is reversibly shiftable (e.g. back-and-forth) by such device in a corresponding (vertical or horizontal) direction. Also such devices are independently controllable by the mode-controlling device 34 and are relatively configured so that the shift directions (vertical and horizontal) are out of alignment or angled with respect to each other. It is to be understood that the shifting may be any two or more independent directions (not necessarily perpendicular). These relationships enable the respective light ray to be shifted consecutively to each of the four output positions 101–104 in a manner that defines a two dimensional pattern. This results in the capability of enhancing image sharpness of a two dimensional input image using two dimensions.

It may be further observed in the preferred embodiment that following each shifting operation a one-to-one correspondence exists between the output rays 33*a*–33*d* exiting the assembly and the input rays 32*a*–32*d* entering the assembly. To clarify this further, it will be noted that a respective one of the light rays (e.g. 33*a*) transmitted by the optical assembly 22 from an arbitrarily selected one of the output positions is solely derived from the light (e.g. 32*a*) received from a single one of the input positions. Thus, following each shifting operation, the portion of the pattern information conveyed in each one of the light rays transmitted by the assembly is preserved free of combination with the portion of the pattern information conveyed by any other ones of the light rays. Hence, double or "ghost" image components may be avoided and information otherwise lost through superposition of rays from different parts of the information is retained.

Referring to FIGS. 2A–5A it may be observed that the way in which the preferred optical assembly 22 achieves the above effect is by restricting the travel of each transmitted light ray (33*a*–33*d*) to a corresponding one of a series of internal paths (35*a*–35*d*) extending in substantially parallel relationship to one another. Hence, with respect to each light shifting device 42, 44, and the optical assembly 22 (taken as a whole), as a result of each shifting operation, the transmitted light rays are shifted in the same direction by the same amount. If these constraints were not observed, it would be possible for two lights rays at two different input positions to combine at one output position.

Referring to FIGS. 2A–5A, it will be noted that following each switching operation, each input ray 32*a*–32*d* is transmitted through the optical assembly 22 along an unbranched, that is undivided, path. In particular, each input ray proceeds through the assembly so as to be free of combination within the assembly with any divided part of itself. This avoids the creation of "ghost" output components and the necessity of precisely matching timing and device characteristics to make possible light recombination.

A significant advantage of the present invention is that the image processing system may be alternately operated in a first and second mode, wherein the first mode simulates a blurring effect thereby removing distorting aliasing components from the light image, and wherein the second mode provides interpixel sampling of the visual image for enhanced resolution. The blurring effect is typically accomplished by switching the image location relative to the sensor at a rate faster than the period of the sensor sampling. It may be initially noted that photoreceptors 40a–40d shown in FIG. 2B, for example, are characterized by a capture rate representing the reciprocal of the time period provided for each photoreceptor to detect (or capture) a single sample.

Figure 6:
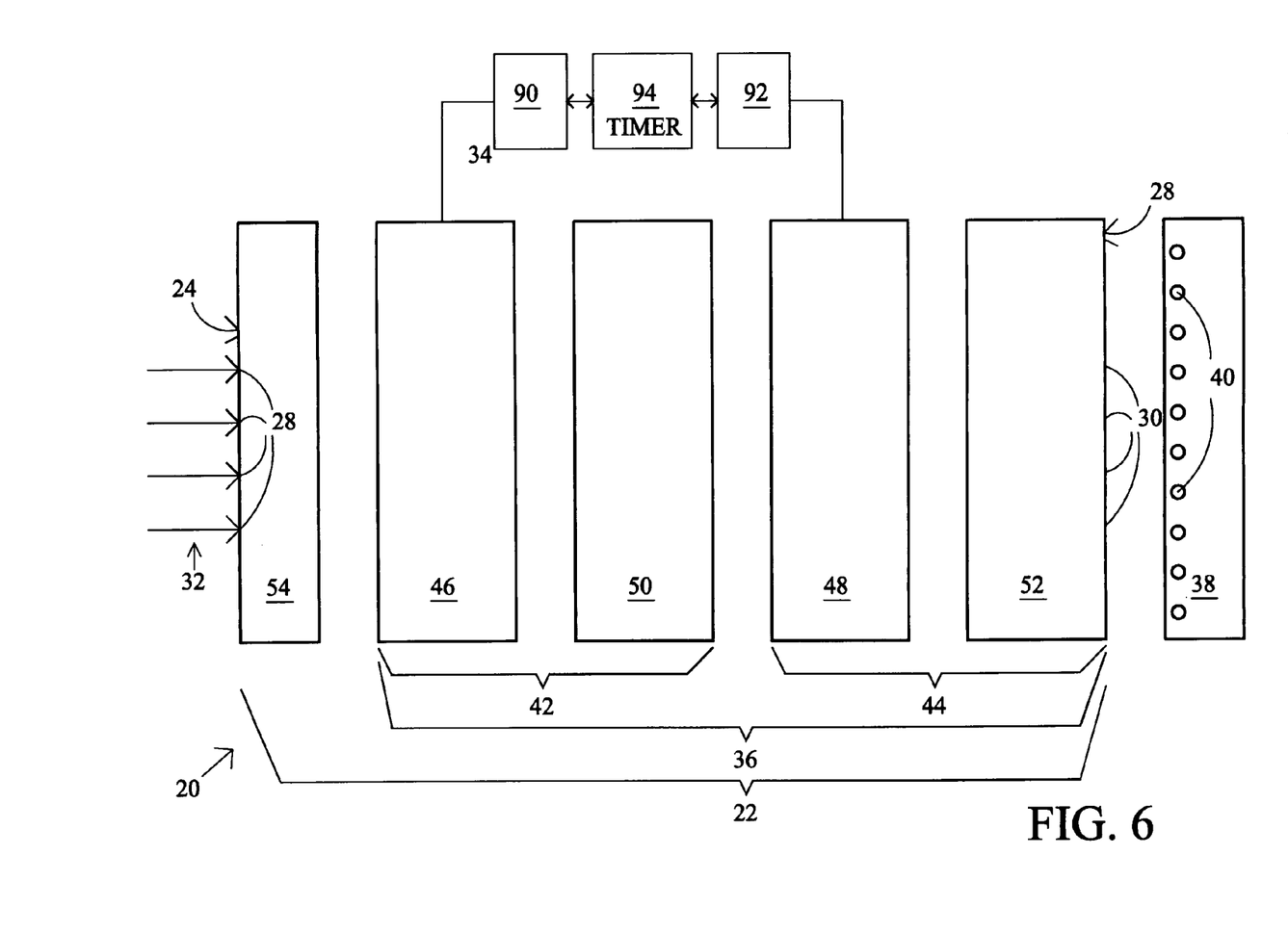
FIG. 6 depicts a mode-controller of FIG. 1.

Referring to FIG. 6, in addition to having individually controllable first and second state changing devices 90 and 92, the mode-controlling device 34 also includes a timer 94 for increasing and decreasing the rate at which the state changing devices toggle between their respective pair of electrical control states (represented by 0's and 1's FIGS. 2A–5A). In the first mode, the timer 94 is set to drive the optical assembly 22 so that respective ones of the light rays are shifted between respective ones of the output positions at a shift rate faster than the capture rate of the photoreceptors. The net effect is that each photoreceptor integrates the light received at multiple input positions (e.g. four positions for the embodiment shown) in the time period taken by the optical assembly to be toggled through each of its consecutive states. In will be recognized that an appropriate shift rate will be at least an integer multiple of the capture rate where the integer value will correspond to the number of shift operations comprising a full cycle. This removes (averages out) the aliasing components that cause image distortion at the photoreceptors. This first mode may be characterized as a "fast" blurring mode that may be contrasted with the traditional approach of using split simultaneous beams to achieve the blurring effect.

In the second mode, the timer 94 is set to drive the optical assembly 22 so that respective ones of the light rays are shifted between respective ones of the output positions at a shift rate preferably less than or equal to the capture rate of the photoreceptors. In this mode, surprisingly, the aliasing components in each projected image are retained by the optical assembly 22 thereby providing multiple aliased images. The multiple images may be reconstructed via interpixel sampling, as described above, to create a sharper image. This mode of operation recognizes that the aliasing components represent additional information usable for enhancing image sharpness by post-processing of the image sensor using multi-frame resolution enhancement software.

In a typical operating environment, the image processing system 20 can be employed in a video camera having a relatively inexpensive low density CCD, whereupon the first mode of operation can be used to quickly process, in a non-computationally expensive manner, dynamically changing video images free of aliasing distortion. Alternatively, the image processing can be switched to a second mode to where it is desired to use the video camera with a low density CCD for sharply resolving still images. This alternation between modes of operation ensures that both the information enhancing sharpening function and the information reducing blurring function will operate without affecting each other.

In addition, it is readily apparent that the transitions from one state to another may be performed in any order. Further, the number of output states may be selected, as desired, depending on the number of stages. Although the preferred embodiment shows that the respective output positions 101–104 form a two-dimensional pattern defining a square, the pattern may be shaped alternatively as a rhombus or other desired shape by changing the relative orientation of the respective optic axes of the birefringent crystals. It is to be noted that the multiple modes of operation may simply include different numbers of states used for "blurring." Additionally, the order of the liquid crystal and birefringent elements may be reversed, although this is not an optimal configuration because it requires inefficient use of extra elements, notably, a polarizer after each light shifting device.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

The invention claimed is:

1. An image processing system for processing light conveying visual pattern information and represented by individual light rays, said system comprising:
   (a) an optical assembly having an input surface and an output surface, said input and output surfaces defining a plurality of input and output positions, respectively, for said light rays to enter and exit, respectively, said assembly;
   (b) said assembly including a light-shifting apparatus operable so that a respective one of said light rays entering a respective one of said input positions is selectively shiftable by said apparatus in a first direction and, subsequently, in a second direction angled with respect to said first direction from a preceding one to another of said output positions so as to define on an image sensor four output positions for each respective light ray entering said respective one of said input positions, said image sensor having a capture rate;
   (c) said assembly further being operable so that following each shifting operation, a respective one of said light rays transmitted by said assembly from an arbitrarily selected one of said output positions is solely derived from said light received from a single one of said input positions wherein said optical assembly is operable in a manner such that aliasing components of said light are reduced; and
   (d) a mode controlling device having a timer operably connected with said light-shifting apparatus, said mode controlling device selectively switchable between a first state and a second state, said first state causing each of said respective one of said light rays to shift between all four of said output positions during each cycle of said capture rate of said image sensor so as to reduce said aliasing components in two directions, and said second state causing each of said respective ones of said light rays to shift from at most one of said output positions during each cycle of said capture rate of said image sensor.

2. The system of claim 1 wherein said apparatus is operable so that a respective one of said light rays is consecutively shiftable by said apparatus between a first one, second one, third one, and fourth one of said output positions.

3. The system of claim 2 wherein the distance between said first one and said second one, and the distance between said third one and said fourth one are substantially equal.

4. The system of claim 3 wherein said first one, said second one, said third one, and said fourth one are arranged in a square arrangement.

5. The system of claim 1 wherein said apparatus is operable so that a respective one of said light rays transmitted from an arbitrarily selected one of said output positions proceeds through said apparatus free of combination with any divided part of itself.

6. The system of claim 1 wherein said assembly is operable so that a respective one of said light rays transmitted from an arbitrarily selected one of said output positions proceeds through said assembly along a branchless path.

7. The system of claim 1 wherein each light-shifting device further includes a light-shifting unit, said light-shifting unit being operable so that a respective one of said light rays is alternately shifted by said light-shifting unit from one to another of a pair of output positions as a result of said light ray's polarization being rotated by said light-rotating unit from one to another of said output states.

8. The system of claim 1 wherein said apparatus further includes a light-shifting unit and a light-rotating unit, said light-rotating unit being operable so that a respective one of said light rays transmitted thereby is selectively rotatable between a first and second plane polarized state, said light-shifting unit being operable so that said respective one of said light rays is alternately shifted by said light-shifting unit between a first and second position as a result of being rotated by said light-rotating unit between said first and second state, respectively.

9. The system of claim 1 wherein said assembly is operable so that following each shifting operation, a one-to-one correspondence exists between said output rays exiting said assembly and said input rays entering said assembly.

10. The system of claim 1 wherein said assembly is operable so that following each shifting operation, each one of said light rays transmitted by said assembly follows an unbranched path through said assembly.

11. The system of claim 1 wherein each device being configured so that if a respective one of said rays is shifted by said device, then each one of said light rays transmitted by said device is correspondingly shifted together with said respective one of said rays in the same direction by the same amount.

12. The system of claim 1 wherein said assembly further being operable so that following each shifting operation, each one of said light rays transmitted by said assembly is restricted in travel with said assembly to a corresponding one of a series of. internal paths extending in substantially parallel relationship to each other.

13. An image processing system for processing light conveying visual pattern information and represented by individual light rays, said system comprising:
  (a) an optical assembly having an input surface and an output surface, said input and output surfaces defining a plurality of input and output positions, respectively, for said light rays to enter and exit, respectively, said assembly;
  (b) said assembly including opposing first and second light-shifting devices, each device being operable so that a respective one of said light rays incident thereon is reversibly shiftable by said device in a corresponding direction, said devices being independently controllable and relatively configured so that said directions are out of alignment with each other so as to enable a respective one of said input rays entering a respective one of said input positions to be shifted consecutively on an image sensor having a capture rate to a first one, second one, third one, and fourth one of said output positions in a manner defining a two-dimensional pattern;
  (c) each device being configured so that if a respective one of said rays is shifted by said device, then each one of said light rays transmitted by said device is correspondingly shifted together with said respective one of said rays in the same direction by the same amount, wherein said optical assembly is operable in a manner such that aliasing components of said light are reduced; and
  (d) a mode controlling device having a timer operably connected with said light-shifting apparatus, said mode controlling device selectively switchable between a first state and a second state, said first state causing each of said respective one of said light rays to shift between all four of said output positions during each cycle of said capture rate of said image sensor so as to reduce said aliasing components in two directions, and said second state causing each of said respective ones of said light rays to shift from at most one of said output positions during each cycle of said capture rate of said image sensor.

14. The system of claim 13 wherein said assembly is operable so that a respective one of said light rays transmitted from an arbitrarily selected one of said input positions proceeds through said assembly along a branchless path.

15. The system of claim 13 wherein each of said light-shifting devices includes a light-shifting unit and a light-rotating unit, said light-rotating unit being operable so that a respective one of said light rays transmitted thereby is selectively rotatable between a first and second plane polarized state, said light-shifting unit being operable so that said respective one of said light rays is alternately shifted by said light-shifting unit between a first and second position as a result of being rotated by said light-rotating unit between said first and second state, respectively.

16. The system of claim 13 wherein said assembly further being operable so that following each shifting operation, a respective one of said light rays transmitted by said assembly from an arbitrarily selected one of said output positions is solely derived from said light received from a single one of said input positions.

17. The system of claim 13 wherein said apparatus is operable so that a respective one of said light rays is consecutively shiftable by said apparatus between a first one, second one, third one, and fourth one of said output positions.

18. The system of claim 17 wherein the distance between said first one and said second one, and the distance between said third one and said fourth one are substantially equal.

19. The system of claim 18 wherein said first one, said second one, said third one, and said fourth one are arranged in a square arrangement.

20. The system of claim 13 wherein said apparatus is operable so that a respective one of said light rays transmitted from an arbitrarily selected one of said output positions proceeds through said apparatus free of combination with any divided part of itself.

21. The system of claim 13 wherein each light-shifting device further includes a light-shifting unit, said light-shifting unit being operable so that a respective one of said light rays is alternately shifted by said light-shifting unit from one to another of a pair of output positions as a result of said light ray being rotated by said light-rotating unit from one to another of said output states.

22. The system of claim 13 wherein said assembly is operable so that following each shifting operation, a one-to-one correspondence exists between said output rays exiting said assembly and said input rays entering said assembly.

23. The system of claim 13 wherein said assembly is operable so that following each shifting operation, each one of said light rays transmitted by said assembly follows an unbranched path through said assembly.

24. The system of claim 13 wherein said assembly further being operable so that following each shifting operation, each one of said light rays transmitted by said assembly is restricted in travel with said assembly to a corresponding one of a series of internal paths extending in substantially parallel relationship to each other.

25. An image processing system for processing light conveying visual pattern information and represented by individual light rays, said system comprising:
   (a) an optical assembly having an input surface and an output surface, said input and output surfaces defining a plurality of continuous input and output positions, respectively, for said light rays to enter and exit, respectively, said assembly;
   (b) said assembly including a first and second light-shifting device having a first and second light-rotating unit, respectively, each unit being operable so that a respective one of said light rays transmitted thereby is selectively rotatable between a pair of plane polarized states, said devices being serially configured so as to enable a respective one of said light rays entering a respective one of said input positions to be consecutively shifted on an image sensor having a capture rate between a first one, second one, third one, and fourth one of said output positions in correspondence with the four discrete combinations of said states selectable via light-rotating units,
   (c) assembly further being operable so following each shifting operation, each one of said light rays transmitted by said assembly is restricted in travel within said assembly to a corresponding one of a series of internal paths extending in substantially parallel relationship to each other, wherein said optical assembly is operable in a manner such that aliasing components of said light are reduced; and
   (d) a mode controlling device having a timer operably connected with said light-shifting apparatus, said mode controlling device selectively switchable between a first state and a second state, said first state causing each of said respective one of said light rays to shift between all four of said output positions during each cycle of said capture rate of said image sensor so as to reduce said aliasing components in two directions, and said second state causing each of said respective ones of said light rays to shift from at most one of said output positions during each cycle of said capture rate of said image sensor.

26. The system of claim 25 wherein said first one, second one, third one, and fourth one of positions define a two-dimensional pattern.

27. The system of claim 25 wherein said apparatus is operable so that a respective one of said light rays transmitted from an arbitrarily selected one of said output positions proceeds through said apparatus free of combination with any divided part of itself.

28. The system of claim 25 wherein each light-shifting device further includes a light-shifting unit, said light-shifting unit being operable so that a respective one of said light rays is alternately shifted by said light-shifting unit from one to another of a pair of output positions as a result of said light ray being rotated by said light-rotating unit from one to another of said output states.

29. The system of claim 25, further including a mode-controlling device for increasing and decreasing the speed at which said light-shifting devices operate to shift respective ones of said light rays between consecutive ones of said output positions.

30. The system of claim 25 wherein said assembly further being operable so that following each shifting operation, a respective one of said light rays transmitted by said assembly from an arbitrarily selected one of said output positions is solely derived from said light received from a single one of said input positions.

31. The system of claim 25 wherein said apparatus is operable so that a respective one of said light rays is consecutively shiftable by said apparatus between a first one, second one, third one, and fourth one of said output positions.

32. The system of claim 25 wherein said assembly is operable so that a respective one of said light rays transmitted from an arbitrarily selected one of said output positions proceeds through said assembly along a branchless path.

33. The system of claim 25 wherein said apparatus further includes a light-shifting unit and a light-rotating unit, said light-rotating unit being operable so that a respective one of said light rays transmitted thereby is selectively rotatable between a first and second plane polarized state, said light-shifting unit being operable so that said respective one of said light rays is alternately shifted by said light-shifting unit between a first and second position as a result of being rotated by said light-rotating unit between said first and second state, respectively.

34. The system of claim 25 wherein said assembly is operable so that following each shifting operation, a one-to-one correspondence exists between said output rays exiting said assembly and said input rays entering said assembly.

35. The system of claim 25 wherein said assembly is operable so that following each shifting operation, each one of said light rays transmitted by said assembly follows an unbranched path through said assembly.

36. The system of claim 25 wherein each device being configured so that if a respective one of said rays is shifted by said device, then each one of said light rays transmitted by said device is correspondingly shifted together with said respective one of said rays in the same direction by the same amount.

37. An image processing system for processing light conveying visual pattern information and represented by individual light rays, said system comprising:
   (a) an optical assembly having an input surface and an output surface, said input and output surfaces defining a plurality of input and output positions, respectively, for said light rays to enter and exit, respectively, said assembly;
   (b) said assembly including a light-shifting apparatus operable so that a respective one of said light rays entering a respective one of said input positions is selectively shiftable by said apparatus in a first direction from one to another of said output positions and, subsequently, in a second direction nonaligned with said first direction from a preceding one to another of said output positions so as to define on an image sensor four output positions for each respective light ray entering said respective one of said input positions, said image sensor having a capture rate;
   (c) said assembly further being operable so that the portion of said pattern information conveyed in each one of said light rays transmitted by said assembly is, following each shifting operation, preserved free of combination with the portion of said pattern information conveyed by any other ones of said light rays, wherein said optical assembly is operable in a manner such that aliasing components of said light are reduced; and (d) a mode controlling device having a timer operably connected with said light-shifting apparatus, said mode controlling device selectively switchable between a first state and a second state, said first state causing each of said respective one of said light rays to shift between all four of said output positions during each cycle of said capture rate of said image sensor so as to reduce said aliasing components in two directions, and said second state causing each of said respective ones of said light rays to shift from at most one of said output positions during each cycle of said capture rate of said image sensor.

38. The system of claim 37 wherein said apparatus is operable so that a respective one of said light rays is consecutively shiftable by said apparatus between a first one, second one, third one, and fourth one of said output positions.

39. The system of claim 37 wherein said apparatus is operable so that following each shifting operation, a respective one of said light rays transmitted from an arbitrarily selected one of said output positions proceeds through said apparatus along an undivided path.

40. The system of claim 37 wherein said assembly further being operable so that following each shifting operation, a respective one of said light rays transmitted by said assembly from an arbitrarily selected one of said output positions is solely derived from said light received from a single one of said input positions.

41. The system of claim 37 wherein said apparatus is operable so that a respective one of said light rays transmitted from an arbitrarily selected one of said output positions proceeds through said apparatus free of combination with any divided part of itself.

42. The system of claim 37 wherein said assembly is operable so that a respective one of said light rays transmitted from an arbitrarily selected one of said output positions proceeds through said assembly along a branchless path.

43. The system of claim 37 wherein each light-shifting device further includes a light-shifting unit, said light-shifting unit being operable so that a respective one of said light rays is alternately shifted by said light-shifting unit from one to another of a pair of output positions as a result of said light ray being rotated by said light-rotating unit from one to another of said output states.

44. The system of claim 37 wherein said apparatus further includes a light-shifting unit and a light-rotating unit, said light-rotating unit being operable so that a respective one of said light rays transmitted thereby is selectively rotatable between a first and second plane polarized state, said light-shifting unit being operable so that said respective one of said light rays is alternately shifted by said light-shifting unit between a first and second position as a result of being rotated by said light-rotating unit between said first and second state, respectively.

45. The system of claim 37 wherein said assembly is operable so that following each shifting operation, a one-to-one correspondence exists between said output rays exiting said assembly and said input rays entering said assembly.

46. The system of claim 37 wherein each device being configured so that if a respective one of said rays is shifted by said device, then each one of said light rays transmitted by said device is correspondingly shifted together with said respective one of said rays in the same direction by the same amount.

47. The system of claim 37 wherein said assembly further being operable so that following each shifting operation, each one of said light rays transmitted by said assembly is restricted in travel with said assembly to a corresponding one of a series of internal paths extending in substantially parallel relationship to each other.

48. An image processing system for processing light conveying visual pattern information and represented by individual light rays, said system comprising:

(a) an image sensor having a capture rate and including an array of photoreceptors spaced apart from each other at lower spatial density than said visual pattern information such that said pattern information, in the absence of processing by said system, includes aliasing components;

(b) an optical assembly having an input surface and an output surface, said input and output surfaces defining a plurality of input and output positions, respectively, for said light rays to enter and exit, respectively, said assembly, said assembly including a light-shifting apparatus operable so that a respective one of said light rays entering a respective one of said input positions is selectively shiftable by said apparatus between four of said output positions, said assembly being arranged so that said light transmitted from said output positions is projected onto said sensor;

(c) a mode-controlling device to alternately operate said optical assembly in a first and second mode such that said aliasing components are alternately removed and retained by said assembly in said first and second mode, respectively; and (d) a mode controlling device having a timer operably connected with said light-shifting apparatus, said mode controlling device selectively switchable between a first state and a second state, said first state causing each of said respective one of said light rays to shift between all four of said output positions during each cycle of said capture rate of said image sensor so as to reduce said aliasing components in two directions, and said second state causing each of said respective ones of said light rays to shift from at most one of said output positions during each cycle of said capture rate of said image sensor.

49. The system of claim 48 wherein said photoreceptors are characterized by a capture rate representing the reciprocal of the time period provided for each photoreceptor to detect a single sample, and said aliasing information is removed in said first mode as a result of said mode-controlling device driving said assembly to shift respective ones of said light rays between respective ones of said output positions at a. shift rate faster than said capture rate.

50. The system of claim 48 wherein said assembly further being operable so that following each shifting operation a respective one of said light rays transmitted by said assembly from an arbitrarily selected one of said output positions is solely derived from said light received from a single one of said input positions.

51. The system of claim 48 wherein said apparatus is operable so that a respective one of said light rays is consecutively shiftable by said apparatus between a first one, second one, third one, and fourth one of said output positions.

52. The system of claim 48 wherein said apparatus is operable so that a respective one of said light rays transmitted from an arbitrarily selected one of said output positions proceeds through said apparatus free of combination with any divided part of itself.

53. The system of claim 48 wherein said assembly is operable so that a respective one of said light rays transmitted from an arbitrarily selected one of said output positions proceeds through said assembly along a branchless path.

54. The system of claim 48 wherein each light-shifting device further includes a light-shifting unit, said light-shifting unit being operable so that a respective one of said light rays is alternately shifted by said light-shifting unit from one to another of a pair of output positions as a result of said light ray being rotated by said light-rotating unit from one to another of said output states.

55. The system of claim 48 wherein said apparatus further includes a light-shifting unit and a light-rotating unit, said light-rotating unit being operable so that a respective one of said light rays transmitted thereby is selectively rotatable between a first and second plane polarized state, said light-shifting unit being operable so that said respective one of said light rays is alternately shifted by said light-shifting unit between a first and second position as a result of being rotated by said light-rotating unit between said first and second state, respectively.

56. The system of claim 48 wherein said assembly is operable so that following each shifting operation, a one-to-one correspondence exists between said output rays exiting said assembly and said input rays entering said assembly.

57. The system of claim 48 wherein said assembly is operable so that following each shifting operation, each one of said light rays transmitted by said assembly follows an unbranched path through said assembly.

58. The system of claim 48 wherein each device being configured so that if a respective one of said rays is shifted by said device, then each one of said light rays transmitted by said device is correspondingly shifted together with said respective one of said rays in the same direction by the same amount.

59. The system of claim 48 wherein said assembly further being operable so that following each shifting operation, each one of said light rays transmitted by said assembly is restricted in travel with said assembly to a corresponding one of a series of internal paths extending in substantially parallel relationship to each other.

60. An image processing system for processing light conveying visual pattern information and represented by individual light rays, said system comprising:

(a) an optical assembly having an input surface and an output surface, said input and output surfaces defining a plurality of input and output positions, respectively, for said light rays to enter and exit, respectively, said assembly, said assembly including a light-shifting apparatus operable so that a respective one of said light rays entering a respective one of said input positions is selectively shiftable by said apparatus onto an image sensor having a capture rate between four of said output positions;

(b) a mode-controlling device to alternately operate said optical assembly in a first and second mode such that the rate at which said apparatus shifts a respective one of said light rays between respective ones of said output positions is increased and decreased for operation in said first mode and second mode, respectively, wherein said optical assembly is operable in a manner such that aliasing components of said light are reduced; and (d) a mode controlling device having a timer operably connected with said light-shifting apparatus, said mode controlling device selectively switchable between a first state and a second state, said first state causing each of said respective one of said light rays to shift between all four of said output positions during each cycle of said capture rate of said image sensor so as to reduce said aliasing components in two directions, and said second state causing each of said respective ones of said light rays to shift from at most one of said output positions during each cycle of said capture rate of said image sensor.

61. The system of claim 60 wherein said assembly is operable so that following each shifting operation, a one-to-one correspondence exists between said output rays exiting said assembly and said input rays entering said assembly.

62. The system of claim 60 wherein said assembly is operable so that following each shifting operation, each one of said light rays transmitted by said assembly follows an unbranched path through said assembly.

63. The system of claim 60 wherein said photoreceptors are characterized by a capture rate representing the reciprocal of the time period provided for each photoreceptor to detect a single sample, and said aliasing information is removed in said first mode as a result of said mode-controlling device driving said assembly to shift respective ones of said light rays between respective ones of said output positions at a shift rate faster than said capture rate.

64. The system of claim 60 wherein said assembly further being operable so that following each shifting operation, a respective one of said light rays transmitted by said assembly from an arbitrarily selected one of said output positions is solely derived from said light received from a single one of said input positions.

65. The system of claim 60 wherein said apparatus is operable so that a respective one of said light rays transmitted from an arbitrarily selected one of said output positions proceeds through said apparatus free of combination with any divided part of itself.

66. The system of claim 60 wherein said assembly is operable so that a respective one of said light rays transmitted from an arbitrarily selected one of said output positions proceeds through said assembly along a branchless path.

67. The system of claim 60 wherein each light-shifting device further includes a light-shifting unit, said light-shifting unit being operable so that a respective one of said light rays is alternately shifted by said light-shifting unit from one to another of a pair of output positions as a result of said light ray being rotated by said light-rotating unit from one to another of said output states.

68. The system of claim 60 wherein said apparatus further includes a light-shifting unit and a light-rotating unit, said light-rotating unit being operable so that a respective one of said light rays transmitted thereby is selectively rotatable between a first and second plane polarized state, said light-shifting unit being operable so that said respective one of said light rays is alternately shifted by said light-shifting unit between a first and second position as a result of being rotated by said light-rotating unit between said first and second state, respectively.

69. The system of claim 60 wherein said assembly is operable so that following each shifting operation, a one-to-one correspondence exists between said output rays exiting said assembly and said input rays entering said assembly.

70. The system of claim 60 wherein said assembly is operable so that following each shifting operation, each one of said light rays transmitted by said assembly follows an unbranched path through said assembly.

71. The system of claim 60 wherein each device being configured so that if a respective one of said rays is shifted by said device, then each one of said light rays transmitted by said device is correspondingly shifted together with said respective one of said rays in the same direction by the same amount.

72. The system of claim 60 wherein said assembly further being operable so that following each shifting operation, each one of said light rays transmitted by said assembly is restricted in travel with said assembly to a corresponding one of a series of internal paths extending in substantially parallel relationship to each other.

\* \* \* \* \*

UNITED STATES PATENT AND TRADEMARK OFFICE
CERTIFICATE OF CORRECTION

PATENT NO.       : 7,116,370 B1  
APPLICATION NO.  : 09/540281  
DATED            : October 3, 2006  
INVENTOR(S)      : Huang et al.

It is certified that error appears in the above-identified patent and that said Letters Patent is hereby corrected as shown below:

Column 2, line 11 - change "Niskioska" to --Nishioka--

Column 2, line 16 - change "Niskioska" to --Nishioka--

Column 2, line 18 - change "Niskioska" to --Nishioka--

Column 2, line 61 - change "Niskioska" to --Nishioka--

Column 6, line 1 - change ""state 1,1" to --state 1,1--

Column 6, lines 29, 30 - change "second liquid crystal second liquid crystal" to --second liquid crystal--

Column 9, line 23 - change "In will be" to --It will be--

Column 11, line 43 (Claim 12) - change "series of." to --series of--

Column 16, line 54 (Claim 49) - change "a. shift rate" to --a shift rate--

Column 18, line 1 (Claim 60) - change "(d)" to --(c)--

Signed and Sealed this

Tenth Day of June, 2008

JON W. DUDAS  
*Director of the United States Patent and Trademark Office*